3,073,871
HYDROFLUORINATION OF ALKYNES

William H. Snavely, Jr., and Peter J. Manno, Ponca City, Okla., assignors to Continental Oil Company, Ponca City, Okla., a corporation of Delaware
No Drawing. Filed Mar. 31, 1960, Ser. No. 18,852
4 Claims. (Cl. 260—653.6)

This invention relates to a process involving the reaction of hydrogen fluoride with an alkyne and more particularly to a process whereby difluorohydrocarbons may be produced by said reaction. In one aspect, this invention relates to a process involving the reaction of hydrogen fluoride with acetylene to produce 1,1-difluoroethane.

Heretofore, commercial processes involving the hydrofluorination of alkynes have been limited to those carried out in the presence of a catalyst. It has been stated that the reaction, in the absence of a catalyst, proceeds with difficulty and poor yields of the desired fluorohydrocarbons as the general rule.

Thus, noncatalytic hydrofluoroination of alkynes requires employment of superatmospheric pressures and, in some instances, the use of low temperatures of the order of −25° to −60° C. According to "Organic Reactions," volume 2, page 66 (1944), the reaction of acetylene with hydrogen fluoride is violent and uneven, since at low temperatures the reaction tends toward explosive violence, whereas at higher temperatures much resinification takes place; while the higher acetylenes may be hydrofluorinated more readily than acetylene, low temperatures of the order of −20° C. are generally required for satisfactory reaction. In an attempt to overcome the foregoing difficulties, a rather large number of processes, each of which used a different catalyst, have been proposed for the hydrofluorination of alkynes. At best, however, the yields of the desired product obtainable using these proposed catalytic processes have been limited to about 85 percent of theory. As a consequence, none of the processes heretofore available for accomplishing this reaction have been entirely satisfactory.

It is accordingly a principal object of the present invention to provide a process for the hydrofluorination of alkynes which process obviates the disadvantages of the prior art processes.

It is another object of our invention to provide a process for carrying out the foregoing reaction which is economical and simple to operate.

It is another object of the present invention to provide a hydrofluorination process which avoids the necessity of carrying out the reaction at low temperatures.

It is another object of our invention to provide a hydrofluorination process which avoids the necessity of the employment of high pressures.

It is another object of this invention to provide a process for the hydrofluorination of alkynes whereby substantially quantitative yields of the fluorohydrocarbon may be obtained.

Other objects and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a process for producing fluorohydrocarbons which comprises: Reacting an alkyne with hydrogen fluoride at a temperature varying from 0° to 80° C. The reaction is carried out in the presence of a large excess of hydrogen fluoride and for a period of time varying from about 1 to about 500 hours and preferably from about 10 to 160 hours. Upon completion of the reaction, the fluorohydrocarbon can be easily recovered from the reaction mixture by distillation.

Before proceeding with specific examples illustrating our invention, it may be well to indicate in general the nature of the materials required in the process.

Suitable alkynes also known as acetylenes are those containing up to ten carbon atoms. The preferred alkyne for use in our process is acetylene. We wish to point out, however, that we only prefer this particular compound because the product obtained by the hydrofluorination of acetylene produces 1,1-difluoroethane, a product highly useful itself or useful in the synthesis of vinyl fluoride. Other alkynes are hydrofluorinated by a method of our process with equal ease. This is true, because, regardless of the specific alkyne employed, substantially quanitative yields of the fluorohydrocarbon may be obtained by following the procedure of our invention. Examples of other alkynes which can be employed include propyne, butyne, pentyne, hexyne, heptyne, octyne, and the like.

As to the hydrogen fluoride used, that should be anhydrous and should be used in a large excess. An important facet of our invention is that feature. We have found that, if as a minimum about 22 moles of hydrogen fluoride are used per mole of the alkyne, the yield of the fluorohydrocarbon is substantially quantitative; however lower mole ratios can be used with a sacrifice in selectivity. Thus the mole ratio of hydrogen fluoride to acetylene can vary broadly from about 10 to about 100 to 1 or higher and preferably is at least about 22 to 1. When employing about 22 moles of hydrogen fluoride with acetylene and carrying out the reaction at room temperature, a period of about 160 hours is required for the reaction to proceed to about 90 percent completion. Higher alkynes can be converted to the corresponding fluorohydrocarbons in the same yield under the same experimental conditions in a shorter time. If a large amount of hydrogen fluoride is used, all other variables remaining constant, the reaction time is correspondingly decreased. As is true of chemical reactions in general an increase in temperature accelerates the reaction. We have found that, at the higher temperatures employed, there was no danger of resinification.

Usually the reaction is carried out with the reactants in the vapor phase and at a pressure corresponding to the vapor pressure of the reactants at the reaction temperature. It is within the scope of the invention, however, to employ more elevated pressures; and, in addition, the reaction can be carried out as the mixed phase as, for example, the hydrogen fluoride can be in the liquid state.

In order to disclose the nature of the present invention still more clearly, the following illustrative example will be given. It is understood that the invention is not to be limited to the specific conditions or details set forth in this example except insofar as such limitations are specified in the appended claims.

Example

In this example, various amounts of anhydrous hydrogen fluoride were admixed with acetylene, and the reaction was allowed to proceed for the periods of time noted at room temperature. Generally, for convenience, we prefer to operate between 20° to 30° C. The experiments together with the results are summarized below.

| Moles of HF per mole of acetylene: | Time required in hours to 90 percent conversion to $CH_3CHF_2$ |
|---|---|
| 22 | 160 |
| 35 | 75 |
| 47 | 45 |

Additional experiments were run at higher temperatures, up to 80° C. At the higher temperatures, as expected, the reaction rate was accelerated. Also when a larger relative amount of hydrogen fluoride was used, the reaction rate was again accelerated.

A very important fact in our process is that the only product formed in the reaction is the corresponding fluorohydrocarbon; there are no by-products. As, for example, when acetylene is the specific alkyne used, the only product formed is 1,1-difluoroethane.

While particular embodiments of the invention have been described, it will be understood, of course, that the invention is not limited thereto since many modifications may be made, and it is therefore contemplated to cover by the appended claims any such modifications as fall within the true spirit and scope of the invention.

The invention having thus been described, what is claimed and desired to be secured by Letters Patent is:

1. A process for the manufacture of difluoroethane by hydrofluorination of an alkyne which comprises reacting acetylene with anhydrous hydrogen fluoride in the absence of a catalyst at a temperature varying from 0° to 80° C. wherein the amount of the hydrogen fluoride varies from about 10 to about 100 moles per mole of said acetylene for a period of time varying from about 1 to about 500 hours, and recovering difluoroethane product.

2. The process of claim 1 wherein the temperature employed varies from 20° to 30° C.

3. The process for the manufacture of difluoroethane by hydrofluorination of an alkyne which comprises reacting acetylene with said hydrogen fluoride in the absence of a catalyst at a temperature varying from 0° to 80° C. and a pressure corresponding to the vapor pressures of said reactants wherein the amount of the hydrogen fluoride is at least about 22 moles per mole of said acetylene for a period of time varying from about 10 to about 160 hours and recovering difluoroethane product.

4. The process of claim 3 wherein the temperature employed varies from 20° to 30° C.

References Cited in the file of this patent

UNITED STATES PATENTS 2,287,934  Grosse et al. _____ June 30, 1942

FOREIGN PATENTS 772,109  Great Britain _____ Apr. 10, 1957

OTHER REFERENCES

Grosse et al.: J.A.C.S., vol. 64, pages 2289–92 (1942).

UNITED STATES PATENT OFFICE
CERTIFICATE OF CORRECTION

Patent No. 3,073,871  January 15, 1963

William H. Snavely, Jr., et al.

It is hereby certified that error appears in the above numbered patent requiring correction and that the said Letters Patent should read as corrected below.

Column 2, line 18, for "quanitative" read -- quantitative --; same column 2, line 39, for "large" read -- larger --.

Signed and sealed this 3rd day of September 1963.

(SEAL)
Attest:

ERNEST W. SWIDER
Attesting Officer

DAVID L. LADD
Commissioner of Patents